(12) United States Patent
Widmer et al.

(10) Patent No.: US 11,980,228 B2
(45) Date of Patent: May 14, 2024

(54) MANUFACTURING A FLUID PERMEABLE HEATER ASSEMBLY WITH CAP

(71) Applicant: Altria Client Services LLC, Richmond, VA (US)

(72) Inventors: Jean-Marc Widmer, Lignieres (CH); Keethan Dasnavis Fernando, Neuchatel (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 17/830,556

(22) Filed: Jun. 2, 2022

(65) Prior Publication Data
US 2022/0295905 A1    Sep. 22, 2022

Related U.S. Application Data

(60) Division of application No. 16/934,233, filed on Jul. 21, 2020, now abandoned, which is a division of
(Continued)

(30) Foreign Application Priority Data

Jul. 25, 2016  (EP) .................................... 16180956

(51) Int. Cl.
  *A24F 40/46*  (2020.01)
  *A24F 40/10*  (2020.01)
  (Continued)

(52) U.S. Cl.
  CPC .............. *A24F 40/46* (2020.01); *A24F 40/70* (2020.01); *B21D 28/26* (2013.01);
  (Continued)

(58) Field of Classification Search
  CPC .......... A24F 40/46; A24F 40/10; A24F 40/70; B29K 2071/00; B29K 2995/0005; B29L 2031/565
  See application file for complete search history.

(56) References Cited

U.S. PATENT DOCUMENTS

| | | | |
|---|---|---|---|
| 5,388,594 | A | 2/1995 | Counts et al. |
| 6,095,153 | A | 8/2000 | Kessler et al. |

(Continued)

FOREIGN PATENT DOCUMENTS

| | | |
|---|---|---|
| CN | 103960781 A | 8/2014 |
| CN | 203762290 U | 8/2014 |

(Continued)

OTHER PUBLICATIONS

Notice of Allowance dated Jan. 19, 2023 issued in related Korean patent application No. 10-2019-7000919.
(Continued)

*Primary Examiner* — Minh N Trinh
(74) *Attorney, Agent, or Firm* — Harness, Dickey & Pierce, P.L.C.

(57) ABSTRACT

A method for manufacturing a fluid permeable heater assembly includes providing a heating element, and over-molding a cap on edge areas of one side of the heating element. The cap includes a hollow body having a first cap opening and a second cap opening. The first cap opening is opposite to the second cap opening, and the heating element is mounted on the cap such that the heating element extends across the first cap opening.

8 Claims, 8 Drawing Sheets

Related U.S. Application Data application No. 15/659,055, filed on Jul. 25, 2017, now Pat. No. 10,737,419, which is a continuation of application No. PCT/EP2017/065307, filed on Jun. 21, 2017.

(51) Int. Cl.

| | | |
|---|---|---|
| *A24F 40/70* | (2020.01) | |
| *B21D 28/26* | (2006.01) | |
| *B29C 45/14* | (2006.01) | |
| *B29K 71/00* | (2006.01) | |
| *B29L 31/56* | (2006.01) | |

(52) U.S. Cl.
CPC .. *B29C 45/14336* (2013.01); *B29C 45/14598* (2013.01); *B29C 45/14639* (2013.01); *A24F 40/10* (2020.01); *B29K 2071/00* (2013.01); *B29K 2995/0005* (2013.01); *B29L 2031/565* (2013.01)

(56) References Cited

U.S. PATENT DOCUMENTS

| | | | |
|---|---|---|---|
| 9,408,416 | B2 | 8/2016 | Monsees et al. |
| 10,149,498 | B2 | 12/2018 | Batista et al. |
| 10,463,076 | B2 | 11/2019 | Garthaffner et al. |
| 10,737,419 | B2 | 8/2020 | Widmer et al. |
| 2013/0042865 | A1 | 2/2013 | Monsees et al. |
| 2014/0109921 | A1 | 4/2014 | Chen |
| 2014/0190496 | A1* | 7/2014 | Wensley ............. A61M 11/042 131/273 |
| 2015/0208728 | A1 | 7/2015 | Lord |
| 2015/0327598 | A1 | 11/2015 | Xiang |
| 2015/0335070 | A1 | 11/2015 | Sears et al. |
| 2018/0020737 | A1 | 1/2018 | Mironov et al. |
| 2018/0021997 | A1 | 1/2018 | Widmer et al. |
| 2019/0075852 | A1 | 3/2019 | Batista et al. |
| 2020/0346380 | A1 | 11/2020 | Widmer et al. |
| 2022/0295905 | A1* | 9/2022 | Widmer ............ B29C 45/14336 |

FOREIGN PATENT DOCUMENTS

| | | | |
|---|---|---|---|
| CN | 104582513 | A | 4/2015 |
| CN | 204275207 | U | 4/2015 |
| DE | 19854009 | A1 | 5/2000 |
| EP | 3487323 | B1 | 9/2020 |
| KR | 10-0264617 | B1 | 9/2000 |
| KR | 10-1375315 | B1 | 3/2014 |
| RU | 2528945 | C1 | 9/2014 |
| UA | 41898 | | 10/2001 |
| WO | WO-1999/020939 | A1 | 4/1999 |
| WO | WO-2013/042865 | A1 | 3/2013 |
| WO | WO-2015/117700 | A1 | 8/2015 |
| WO | WO-2015/117701 | A1 | 8/2015 |
| WO | WO-2015/117702 | A1 | 8/2015 |
| WO | WO-2015/117703 | A1 | 8/2015 |
| WO | WO-2015/117704 | A1 | 8/2015 |
| WO | WO-2015/117705 | A2 | 8/2015 |
| WO | WO-2015/165814 | A1 | 11/2015 |
| WO | WO-2016/096497 | A1 | 6/2016 |
| WO | WO-2016/096733 | A1 | 6/2016 |
| WO | WO-2016/096745 | A1 | 6/2016 |
| WO | WO-2016/096780 | A1 | 6/2016 |
| WO | WO-2017/207320 | A1 | 12/2017 |
| WO | WO-2018/019486 | A1 | 2/2018 |

OTHER PUBLICATIONS

European Search Report for European Application No. 16180956 dated Jan. 23, 2017.
Written Opinion for Application No. PCT/EP2017/065307 dated Sep. 19, 2017.
International Search Report and Written Opinion for corresponding Application No. PCT/EP2017/065307 dated Sep. 20, 2017.
Preliminary Report on Patentability for corresponding International Application No. PCT/EP2017/065307 dated Feb. 7, 2019.
European Notice of Allowance for corresponding Application No. 17731898.7, dated May 27, 2020.
Russian Office Action and Search Report dated Sep. 25, 2020 for corresponding Russian Application No. 2019103982 and English language translations thereof.
Russian Notice of Allowance dated Nov. 9, 2020 for corresponding Russian Application No. 2019103982, and English-language translation thereof.
Japanese Office Action dated Apr. 1, 2021 for corresponding Japanese Application No. 2019-503465, and English-language translation thereof.
Chinese Office Action dated Apr. 26, 2021 for corresponding Chinese Application No. 201780042653.8, and English-language translation thereof.
Japanese Notice of Allowance dated Nov. 2, 2021 for corresponding Japanese Application No. 2019-503465, and English-language translation thereof.
Chinese Office Action dated Nov. 30, 2021 for corresponding Chinese Application No. 201780042653.8.
Office Action dated Aug. 25, 2023 issued in related Canadian patent application No. 3026977.
Korean Office Action dated Jul. 12, 2022 for corresponding Korean Application No. 10-2019-7000919, and English-language translation thereof.

* cited by examiner

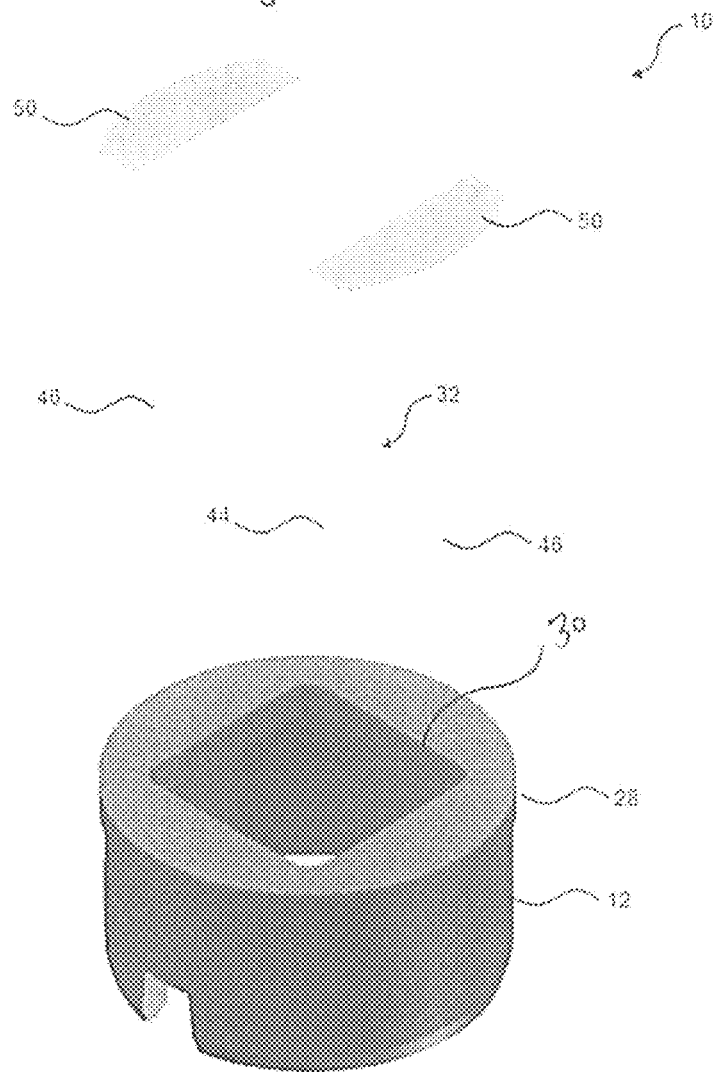

MANUFACTURING A FLUID PERMEABLE HEATER ASSEMBLY WITH CAP

CROSS-REFERENCE TO RELATED APPLICATIONS

This application is a divisional of application Ser. No. 16/934,233, filed Jul. 21, 2020, which is a divisional of application Ser. No. 15/659,055 filed Jul. 25, 2017, which is a continuation of, and claims priority to, International Application No. PCT/EP2017/065307, filed on Jun. 21, 2017, and further claims priority under 35 U.S.C. § 119 to European Patent Application No. 16180956.1, filed Jul. 25, 2016, the entire contents of each of which are incorporated herein by reference.

BACKGROUND

Field

At least one example embodiment relates to aerosol-generating systems, such as handheld electrically operated aerosol-generating systems. At least one example embodiment relates to the manufacturing of heater assemblies for aerosol-generating systems in which the aerosol-forming substrate is liquid and vaporised.

Description of Related Art

Handheld electrically operated aerosol-generating system may consist of a device portion comprising a battery and control electronics, a cartridge portion comprising a supply of aerosol-forming substrate held in a liquid storage portion, and an electrically operated heater assembly acting as a vaporiser. The heater assembly may comprise a fluid permeable heating element that is in contact with a capillary medium like an elongated wick soaked in the liquid aerosol-forming substrate held in the liquid storage portion. The cartridge portion may include a mouthpiece.

SUMMARY

At least one example embodiment relates to a method for manufacturing a heater assembly.

In at least one example embodiment, a method includes providing a heating element, and over-molding a cap on edge areas of one side of the heating element. The cap includes a hollow body having a first cap opening and a second cap opening. The first cap opening is opposite to the second cap opening. The heating element is mounted on the cap such that the heating element extends across the first cap opening.

In at least one example embodiment, the providing a heating element comprises: providing a mesh strip including an alternating sequence of mesh sections having a first mesh density and a second mesh density.

In at least one example embodiment, the providing a heating element comprises: die cutting bevelled window slots out of each side of a first mesh section having the first mesh density, and removing loose wires from the bevelled window slots.

In at least one example embodiment, the first mesh density is lower than the second mesh density.

In at least one example embodiment, the over-molding a cap on edge areas of one side of the heating element comprises: pre-heating plastic granules, injecting the plastic granules into a mold configured to make the cap, and over-molding a cap onto an underside of a portion of the heating element having the second mesh density.

In at least one example embodiment, the over-molding a cap on edge areas of one side of the heating element includes cutting the heater assembly off a mesh strip, and removing loose wires from the heating element.

In at least one example embodiment, the cutting the heater assembly off a mesh strip includes die cutting a mesh off the mesh strip. The heating element includes the mesh, and the mesh is cut within a portion of the mesh having the second mesh density such that the mesh comprises the first mesh section having the first mesh density, a second mesh section having the second mesh density on a first side of the first mesh section, and a third mesh section having the second mesh density on a second side of the first mesh section.

In at least one example embodiment, the method further includes joining at least two electrically conductive contact areas onto edge areas of the heating element.

In at least one example embodiment, the joining at least two electrically conductive contact areas includes providing a tin foil strip (or metallic strip), cutting off tin foil patches (or metallic foil patches) from the tin foil strip in a size that substantially matches a shape and a size of the second mesh section and the third mesh section, and compressing a tin foil patch onto at least one of the second mesh section and the third mesh section.

In at least one example embodiment, the method includes inspecting the heater assembly.

In at least one example embodiment, the inspecting the heater assembly includes transporting the heater assembly to an inspection station, measuring an electrical resistance of the heating element of the heater assembly, visually inspecting the heating element for at least one of correct wire count, clean cut-off of the mesh, correct mesh integrity, debris, or tin foil (or metallic foil) attachment, and rejecting the heater assembly if the heater assembly fails at least one of the expected electrical resistance of the heating element or the expected result of the visual inspection.

At least one example embodiment relates to an apparatus configured to manufacture a fluid permeable heater assembly. The heater assembly includes a cap and a heating element. The heating element is substantially flat and electrically conductive.

In at least one example embodiment, an apparatus configured to manufacture a fluid permeable heater assembly includes a heating element manufacturing unit configured to provide the heating element, and a mesh injection over-molding tool configured to over-mold the cap on edge areas of one side of the heating element. The cap includes a hollow body having a first cap opening and a second cap opening. The first cap opening is opposite to the second cap opening. The heating element is mounted on the cap such that the heating element extends across the first cap opening.

In at least one example embodiment, the heating element manufacturing unit includes a mesh strip bobbin feeding unit configured to provide a mesh strip, the mesh strip including an alternating sequence of mesh sections having a first mesh density and of a second mesh density, and a heater assembly cut-off station configured to cut the heater assembly off the mesh strip by die cutting a mesh off the mesh strip. The heating element includes the mesh. The mesh is cut within a mesh section having the second mesh density, such that the mesh comprises a first mesh section having the first mesh density that is limited by a second mesh section and a third mesh section having the second mesh density.

In at least one example embodiment, the apparatus further includes an injection molding machine configured to pre-heat plastic granules and inject the same into a mold configured to make the cap. The mesh injection over-molding tool is configured to over-mold the cap onto an underside of at least one of the second mesh section or the third mesh section.

BRIEF DESCRIPTION OF THE DRAWINGS

Example embodiments will now be described, by way of example only, with reference to the accompanying drawings.

FIG. 1C is an exploded perspective view of a heater assembly as manufactured in accordance with at least one example embodiment.

DETAILED DESCRIPTION

Figure 1A:
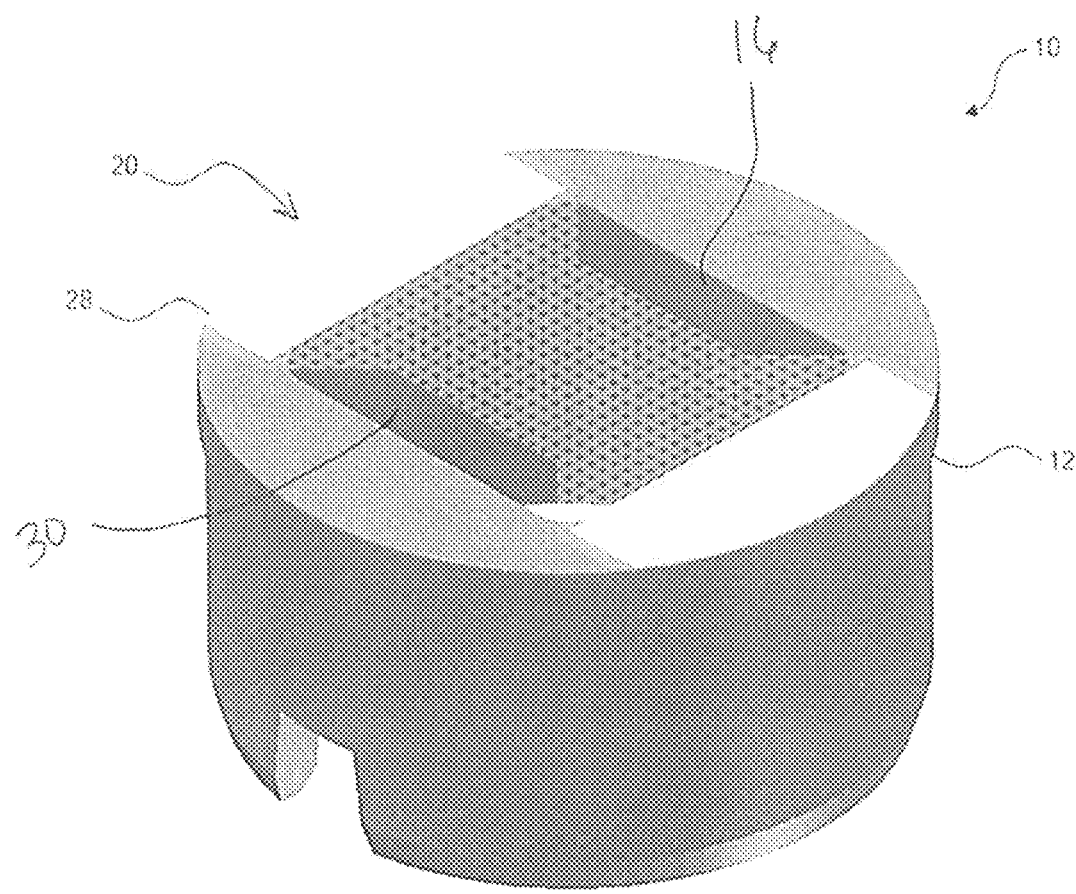
FIG. 1A is a perspective top side view of a heater assembly as manufactured in accordance with at least one example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

At least one example embodiment relates to a method for manufacturing a fluid permeable heater assembly. The heater assembly comprises a cap and a substantially flat electrically conductive heating element. The method comprising, in a first step, providing the heating element, and in a second step, over-molding the cap on edge areas of one side of the heating element. The cap comprises a hollow body with a first and a second cap opening. The first cap opening is opposite to the second cap opening. The heating element is mounted on the cap such that the heating element extends across the first cap opening.

The cap with a hollow body is attached to the heating element to improve stability of the heating element and to provide guidance for a capillary medium that may be arranged in the hollow body of the cap. The use of a cap may simplify the manufacturing of the heater assembly and may improve the rigidity of the heater assembly.

The heater assembly may cap a pre-filled cartridge. The parts of the cartridge may be pre-assembled.

As used herein, "substantially flat" means formed initially in a single plane and not wrapped around or other conformed to fit a curved or other non-planar shape. As used herein, "electrically conductive" means formed from a material having a resistivity of about $1 \times 10^{-4}$ Ohm meter, or less. As used herein, "electrically insulating" means formed from a material having a resistivity of about $1 \times 10^{4}$ Ohm meter or more. As used herein, "fluid permeable" in relation to a heater assembly means that the aerosol-forming substrate, in a gaseous phase and possibly in a liquid phase, can readily pass through the heating element of the heater assembly.

The heater assembly comprises a cap formed from a material with a high thermal decomposition temperature and that is able to tolerate rapid temperature changes. The heating element is supported on the cap. In at least one example embodiment, the cap is molded from plastic granules. The plastic granules may be of polyether ether ketone (PEEK), liquid-crystal polymers (LCP) or any other polymer material. In at least one example embodiment, the cap material is over-molded on the underside of the heating element. In at least one example embodiment, the cap is made of VICTREX PEEK via over-molding on a mesh strip. The underside of the heating element is oriented towards the first cap opening. Over-molding the cap onto the underside of the heating element requires no further mounting material, such as terminals, to fix the heating element on the cap.

In at least one example embodiment, the cap has a size sufficient to distance the liquid storage portion from the heating element by a distance of at least about 1.5 millimeters, or from about 3 millimeters to about 6 millimeters in order to provide a sufficient temperature drop across the cap. In at least one example embodiment, the liquid storage portion can be made from a more cost efficient material with a lower thermal decomposition temperature, such as for example polyethylene or polypropylene.

The heater assembly further comprises a substantially flat heating element allowing for simple manufacture. Geometrically, the term "substantially flat" electrically conductive heating element is used to refer to an electrically conductive arrangement of filaments that is in the form of a substantially two dimensional topological manifold. Thus, the substantially flat electrically conductive heating element extends in two dimensions along a surface substantially more than in a third dimension. In at least one example embodiment, the dimensions of the substantially flat heating element in the two dimensions within the surface is at least five times larger than in the third dimension, normal to the surface. An example of a substantially flat heating element is a structure between two substantially imaginary parallel surfaces, wherein the distance between these two imaginary surfaces is substantially smaller than the extension within the surfaces. In at least one example embodiment, the substantially flat heating element is planar. In at least one example embodiment, the substantially flat heating element is curved along one or more dimensions, for example forming a dome shape or bridge shape.

The term "filament" is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The term "heating element" is used throughout the specification to refer to an arrangement of one or preferably a plurality of filaments. The heating element may be an array of filaments, for example arranged parallel to each other. The heating element is fluid permeable. The heating element may be cut so as to provide open areas when mounting the heating element across the first cap opening. In at least one example embodiment, the open areas are manufactured by cutting bevelled window slots out of each side of the heating element.

In at least one example embodiment, the filaments may form a mesh. The mesh may be woven or non-woven. The mesh may be formed using different types of weave or lattice structures. In at least one example embodiment, the electrically conductive heating element consists of an array of filaments arranged parallel to one another. The mesh, array or fabric of electrically conductive filaments may also be characterized by its ability to retain liquid.

In at least one example embodiment, a substantially flat heating element may be constructed from a wire that is formed into a wire mesh. In at least one example embodiment, the mesh has a plain weave design. In at least one example embodiment, the heating element is a wire grill made from a mesh strip.

The electrically conductive filaments may define interstices between the filaments and the interstices may have a width ranging from about 10 micrometers to about 100 micrometers. In at least one example embodiment, the filaments give rise to capillary action in the interstices, so that in use, liquid to be vaporized is drawn into the interstices, increasing the contact area between the heating element and the liquid aerosol-forming substrate.

The electrically conductive filaments may form a mesh of size ranging from about 60 filaments per centimeter to about 240 filaments per centimeter (+/−10 percent). In at least one example embodiment, the mesh density ranges from about 100 filaments per centimeter to about 140 filaments per centimeter (+/−10 percent). In at least one example embodiment, the mesh density is about 115 filaments per centimeter. The width of the interstices may range from about 100 micrometers to about 25 micrometers, from about 80 micrometers to about 70 micrometers, or be about 74 micrometers. The percentage of open area of the mesh, which is the ratio of the area of the interstices to the total area of the mesh may range from about 40 percent to about 90 percent, from about 85 percent to about 80 percent, or may be about 82 percent. Throughout this specification, the density of such a mesh is referred to as "first mesh density".

Additionally, the mesh may have one or more sections with increased mesh density, referred to as "second mesh density", where the interstices between the filaments are below about 5 micrometers, below about 2 micrometers, and or may be about 1 micrometer. The one or more sections of the mesh with increased mesh density are referred to as "dense areas" throughout this specification.

The electrically conductive filaments may have a diameter ranging from about 8 micrometers to about 100 micrometers, from about 10 micrometers to about 50 micrometers, or from about 12 micrometers to about 25 micrometers. The filaments may have a round cross section or may have a flattened cross-section.

The area of the mesh, array or fabric of electrically conductive filaments may be small, for example less than or equal to about 50 square millimeters, less than or equal to about 25 square millimeters, or may be about 15 square millimeters. The size is chosen such to incorporate the heating element into a handheld system. Sizing of the mesh, array or fabric of electrically conductive filaments less or equal than about 50 square millimeters reduces the amount of total power required to heat the mesh, array or fabric of electrically conductive filaments while still ensuring sufficient contact of the mesh, array or fabric of electrically conductive filaments to the liquid aerosol-forming substrate. The mesh, array or fabric of electrically conductive filaments may, for example, be rectangular and have a length ranging from about 2 millimeters to about 10 millimeters and a width ranging from about 2 millimeters to about 10 millimeters. In at least one example embodiment, the mesh has dimensions of about 5 millimeters by about 3 millimeters. The mesh or array of electrically conductive filaments may cover an area ranging from about 30 percent to about 90 percent of the open area of the first cap opening across which the heating element extends. In at least one example embodiment, the mesh or array of electrically conductive filaments covers an area ranging from about 50 percent to about 70 percent of the open area of the first cap opening. In at least one example embodiment, the mesh or array of electrically conductive filaments covers an area of ranging from about 55 percent to about 65 percent of the open area of the first cap opening.

The filaments of the heating element may be formed from any material with suitable electrical properties. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group.

Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. The filaments may be coated with one or more insulators. Materials for the electrically conductive filaments are stainless steel and graphite. The material may be a 300 series stainless steel like AISI 304, 316, 304L, 316L. Additionally, the electrically conductive heating element may comprise combinations of the above materials. A combination of materials may be used to improve the control of the resistance of the substantially flat heating element. In at least one example embodiment, materials with a high intrinsic resistance may be combined with materials with a low intrinsic resistance. A substantially flat filament arrangement with increased resistance reduces parasitic losses. High resistivity heaters may allow more efficient use of battery energy.

In at least one example embodiment, the filaments are made of wire. In at least one example embodiment, the wire is made of metal, most preferably made of stainless steel.

The electrical resistance of the mesh, array or fabric of electrically conductive filaments of the heating element may range from about 0.3 Ohms to about 4 Ohms. In at least one example embodiment, the electrical resistance is equal or greater than about 0.5 Ohms. In at least one example embodiment, the electrical resistance of the mesh, array or fabric of electrically conductive filaments ranges from about 0.6 Ohms to about 0.8 Ohms, and may be about 0.68 Ohms. The electrical resistance of the mesh, array or fabric of electrically conductive filaments is at least an order of magnitude, or at least two orders of magnitude, greater than the electrical resistance of electrically conductive contact areas. This ensures that the heat generated by passing current through the heating element is localized to the mesh or array of electrically conductive filaments. A low overall resistance for the heating element may be useful if the system is powered by a battery. A low resistance, high current system allows for the delivery of high power to the heating element. This allows the heating element to heat the electrically conductive filaments to a desired temperature quickly.

The hollow body of the cap may be configured to hold a capillary medium. In at least one example embodiment, the heater assembly comprises a host material piece made from the capillary medium for retaining the liquid aerosol-forming substrate. At least a portion of the host material piece may be arranged in the hollow body between the first and the second cap opening.

In at least one example embodiment, the cap and the host material piece may be sized to have a cross-sectional area of about the same size. As used here, about and/or approximately the same size means that a cross-sectional area of the cap comprising the first cap opening may be up to about 30 percent smaller or larger than the capillary material. The shape of the interior space of the hollow body of the cap may also be similar to the shape of the capillary material such that the assembly and the material substantially overlap. In at least one example embodiment, the host material piece is substantially the same size and shape as the interior space of the hollow body. In at least one example embodiment, the interior space of the hollow body is substantially of cylindrical shape. The volume of the interior space of the hollow body may range from about 50 cubic millimeters to about 500 cubic millimeters, from about 100 cubic millimeters to about 250 cubic millimeters, and may be about 150 cubic millimeters.

The host material piece may be provided at least partially in contact with the heating element. When the assembly and the material are substantially similar in size and shape, manufacturing can be simplified and the robustness of the manufacturing process improved.

In at least one example embodiment, the heater assembly comprises a transport material piece made from a capillary medium for transporting liquid aerosol-forming substrate from the host material piece to the heating element. The transport material piece may be provided in contact with the heating element. In at least one example embodiment, the transport material piece is arranged between the heating element and the host material piece. In this case, the host material is not in direct contact with the heating element.

The transport material piece may be made of a material capable of guaranteeing that there is liquid aerosol-forming substrate in contact with at least a portion of the surface of the heating element that extends across the first cap opening. The transport material piece may be in contact with the electrically conductive filaments. The transport material piece may extend into interstices between the filaments. The heating element may draw liquid aerosol-forming substrate into the interstices by capillary action. In at least one example embodiment, the transport material piece is in contact with the electrically conductive filaments over substantially the entire extent of the open area of the first cap opening.

A capillary material is a material that actively conveys liquid from one end of the material to another. The capillary material may be oriented, directly or indirectly via another capillary medium, in contact with a liquid storage portion to convey liquid aerosol-forming substrate towards the heating element.

The capillary material may include even more than two capillary materials including one or more layers of the capillary material directly in contact with the mesh, array or fabric of electrically conductive filaments of the heating element in order to promote aerosol generation.

In at least one example embodiment, the cap comprises a holder with a holder opening. The holder may be a planar disk covering at least the first cap opening and having a thickness ranging from about 0.25 millimeter to about 5 millimeters, about 0.5 millimeter to about 2.5 millimeters, or may be about 0.8 millimeter. The holder opening may have a size ranging from about 10 square millimeters to about 50 square millimeters, about 20 square millimeters to about 30 square millimeters, or may be about 25 square millimeters. The holder may cover the first cap opening such that the holder opening coincides with at least a portion of the first cap opening. The heating element may be mounted on the holder. A surface of the holder is in contact with the heating element and represents a contact area that enlarges the contact area as compared to a cap without a holder. The holder reduces the size of the first cap opening to the size of the holder opening. Enlarging the contact area between the holder and the heating element may improve rigidity of the heater assembly and may ease the assembly thereof. In at least one example embodiment, the cap including the holder is over-molded on the underside of the heating element.

In at least one example embodiment, the cap is integrally formed. The integrally formed cap may include the holder.

The heating element may have at least two electrically conductive contact areas. The electrically conductive contact areas may be positioned at an edge area of the heating element.

In at least one example embodiment, the at least two electrically conductive contact areas are each positioned at a dense area of the heating element. The electrically conductive contact areas may be positioned on extremities of the heating element. An electrically conductive contact area may be fixed directly to the electrically conductive filaments. An electrically conductive contact area may comprise a tin patch. In at least one example embodiment, an electrically conductive contact area may be integral with the electrically conductive filaments.

In at least one example embodiment, the providing of a heating element comprises providing a mesh strip. The mesh strip may comprise an alternating sequence of mesh sections of a first mesh density and a second mesh density. Having sections of a higher density may increase the stability of the mesh while handling it.

The providing the heating element may further comprise die cutting bevelled window slots out of each side of a mesh section of the first mesh density, and removing loose wires from the cut mesh sections of the first mesh density.

In at least one example embodiment, the first mesh density is lower than the second mesh density.

In at least one example embodiment, the step of over-molding of a cap on edge areas of one side of the heating element, comprises pre-heating plastic granules, injecting the pre-heated plastic granules into a mold for making the cap, and over-molding the cap onto the underside of a mesh section of the second mesh density.

In at least one example embodiment, the step of over-molding a cap on edge areas of one side of the heating element further comprises cutting the heater assembly off the mesh strip, and removing debris from the heater assembly.

In at least one example embodiment, the step of cutting the heater assembly off the mesh strip comprises die cutting a mesh off the mesh strip. The heating element comprises the mesh. The mesh is cut within a mesh section of the second mesh density such that the mesh comprises a mesh section of the first mesh density that is limited by mesh sections of the second mesh density on each of the two ends of the cut mesh.

In at least one example embodiment, the method for manufacturing a fluid permeable heater assembly further comprises joining at least two electrically conductive contact areas each onto an edge area of the other side of the heating element.

In at least one example embodiment, the joining at least two electrically conductive contact areas each onto an edge area of the other side of the heating element may comprise providing a tin foil strip, cutting off tin foil patches from a tin foil strip in a size that matches the shape and the size of the mesh section of the second mesh density, and compressing a tin foil patch onto the mesh section of the second mesh density. The foil strip may be made of a softer material than the material of the heating element.

In at least one example embodiment, the method for manufacturing a fluid permeable heater assembly further comprises inspecting the heater assembly.

In at least one example embodiment, the inspecting the heater assembly comprises transporting the heater assembly to inspection stations, measuring the electrical resistance of the heating element of the manufactured heater assembly, visually inspecting the heating element for at least one of correct wire count, clean cut-off of the mesh, correct mesh integrity, debris, or tin foil attachment, and rejecting the heater assembly if the heater assembly fails at least one of the expected electrical resistance of the heating element or the expected result of the visual inspection.

At least one example embodiment relates to an apparatus for manufacturing a fluid permeable heater assembly.

An apparatus for manufacturing a fluid permeable heater assembly may comprise a mesh strip bobbin feeding unit configured to provide a mesh strip. The mesh strip comprises an alternating sequence of mesh sections of a first mesh density and of a second mesh density. The apparatus also includes a tin foil strip bobbin feeding unit configured to provide a tin foil strip, a tin foil cutting station configured to index a length of tin foil to be positioned over the mesh section of the second mesh density and configured to cut tin patches from the provided tin foil strip, and a tin foil pressing station configured to compress and join the tin patches onto the top surface of the mesh section of the second mesh density. The apparatus may also include a mesh window cutting station configured to die cut bevelled window slots out of each side of a mesh section of the first mesh density and a first cleaning station configured to remove loose wires from the cut mesh sections of the first mesh density, small particles, dust, or debris by cleaning with air pressure and vacuuming the surfaces of the cut mesh sections to remove debris. The apparatus may further include an injection molding machine configured to pre-heat plastic granules and inject the same into a mold for making the cap.

In at least one example embodiment, the apparatus may also include a mesh injection over-molding tool (possibly having a single cavity or several cavities) for over-molding the cap onto the underside of the mesh section of the second mesh density. The apparatus may also include a heater assembly cut-off station configured to cut the heater assembly off the mesh strip by die cutting a mesh off the mesh strip. The heating element comprises the mesh, and the mesh is cut within a mesh section of the second mesh density such that the mesh comprises a mesh section of the first mesh density that is limited by mesh sections of the second mesh density on each of the two ends of the cut mesh. The apparatus may also include a second cleaning station configured to remove loose wires from the mesh by cleaning with air pressure and vacuuming the surfaces of the heater assembly to remove debris, and a transfer unit configured to transport the heater assembly to a heater assembly inspection station.

In at least one example embodiment, the heater assembly inspection station may comprise a heater assembly resistance measuring station, a heater assembly vision inspection station, a heater assembly rejection station, a mesh stating pressure testing station, and a heater assembly resistance measuring station configured to measure the electrical resistance of the mesh and the tin foil strip of the manufactured heater assembly. The heater assembly inspection station may also include a heater assembly vision inspection for visually inspecting the heater assembly. The apparatus may also include a heater assembly rejection station configured to reject a heater assembly that is out of specification.

In at least one example embodiment of the manufacturing process, the equipment automatically manufactures a heater assembly from a mesh strip, a tin foil strip, and from plastic granules. The heater assembly comprises a cap and a substantially flat electrically conductive heating element.

In at least one example embodiment, a manufacturing process may comprise a manual loading of at least one of a mesh strip bobbin, a tin foil strip bobbin, and plastic granules. The manufacturing process may further comprise at least one of the method steps that are automatically executed by the manufacturing equipment.

In at least one example embodiment, the process may include providing a mesh strip, the mesh strip comprising an alternating sequence of mesh sections of a first mesh density and of a second mesh density, providing a tin foil strip, indexing a length of tin foil to be positioned over the mesh section of the second mesh density, cutting tin patches from the provided tin foil strip, compressing to join the tin patches onto the top surface of the mesh section of the second mesh density, die cutting bevelled window slots out of each side of a mesh section of the first mesh density, and removing loose wires from the cut mesh sections of the first mesh density, small particles, dust, or debris by cleaning with air pressure and vacuuming the surfaces of the cut mesh sections to remove debris. The process may also include pre-heating plastic granules, injecting the plastic granules into a mold for making the cap, over-molding the cap onto the underside of a mesh section of the second mesh density, cutting the heater assembly off the mesh strip by die cutting a mesh off the mesh strip, the heating element comprising the mesh, and the mesh being cut within a mesh section of the second mesh density such that the mesh comprises a mesh section of the first mesh density that is limited by mesh sections of the second mesh density on each of the two ends of the cut mesh, and removing loose wires from the mesh, small particles, dust, or debris by cleaning with air pressure and vacuuming the surfaces of the mesh to remove debris. The process may also include transporting the heater assembly to an inspection station, measuring the electrical resistance of the mesh of the manufactured heater assembly, visually inspecting the heater assembly for correct wire count, clean cut-off of the mesh, correct mesh integrity, debris and tin foil attachment, and rejecting the heater assembly if it is out of specification.

Features described in relation to one example embodiment may equally be applied to other example embodiments.

FIG. 1A is a perspective top side view of a heater assembly as manufactured in accordance with at least one example embodiment.

FIG. 1A shows a heater assembly 10 comprising a cap 12 with a first cap opening 16 on the top side of the cap and a second cap opening 18 on the bottom side of the cap 12. The first cap opening 16 is covered by a holder 28 with a holder opening 30. The heater assembly 10 further comprises a heating element 20 which extends across the holder opening 30.

Figure 1B:
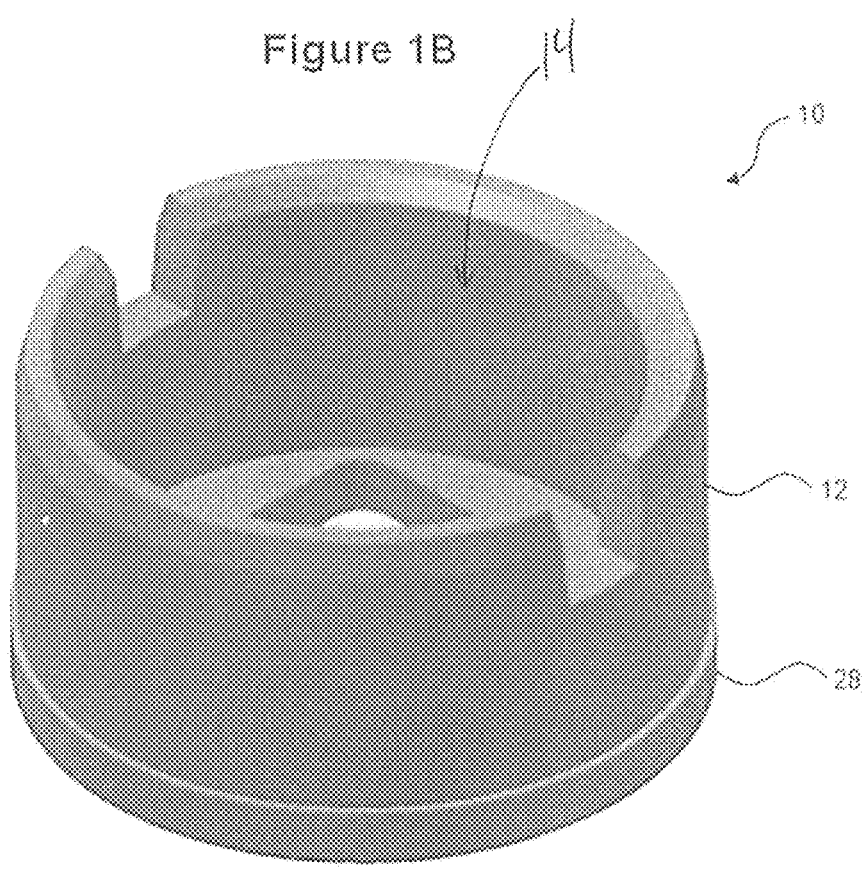
FIG. 1B is a perspective bottom side view of a heater assembly as manufactured in accordance with at least one example embodiment.

FIG. 1B is a perspective bottom side view of a heater assembly as manufactured in accordance with at least one example embodiment.

FIG. 1B shows the heating assembly 10 from a bottom view. The interior space of the hollow body 14 of the cap 12 becomes visible.

FIG. 1C is an exploded perspective view of a heater assembly as manufactured in accordance with at least one example embodiment.

FIG. 1C shows the components of the heating element 20 comprising a mesh 32. The mesh 32 has a first mesh section 44 of a first mesh density and, on each of its two extremities, a second mesh section 46 of a second mesh density, wherein the second mesh density is higher than the first density. A tin foil patch 50 is joined with each of the two mesh sections 46 of the second mesh density. The heating element 20, respectively its mesh 32, is arranged across the holder opening 30 of the holder 28 on top of the cap 12. The entire mesh section 44 of the first mesh density is arranged above the holder opening 30.

Figure 2A:
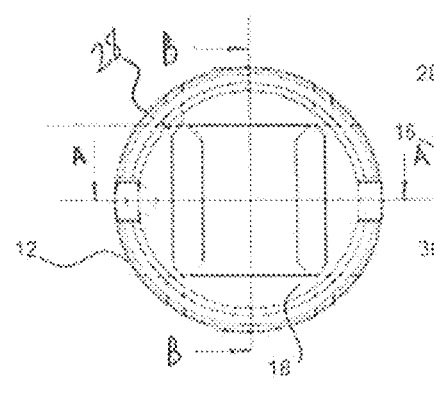
FIG. 2A is a top view of a cap and a holder manufactured in accordance with at least one example embodiment.

FIG. 2A is a top view of a cap and a holder manufactured in accordance with at least one example embodiment.

Figure 2B:
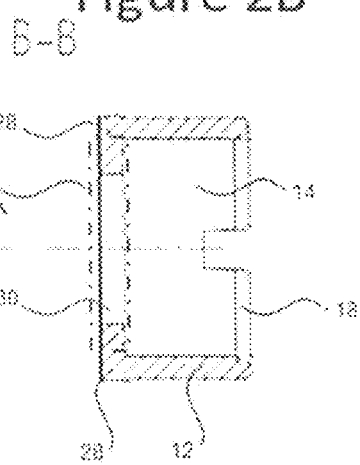
FIGS. 2B and 2C are cross-sectional views along lines A-A and B-B of FIG. 2A in accordance with at least one example embodiment.
Figure 2C:
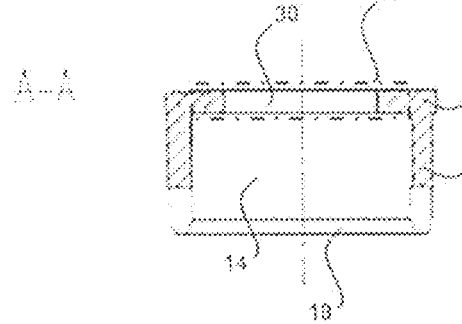
Figure 2D:
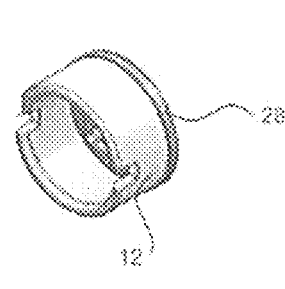
FIG. 2D is a perspective view of a cap and a holder as manufactured in accordance with at least one example embodiment.

FIG. 2A shows the cap 12 and its holder 28. The holder 28 may be a separate part. In at least one example embodiment, the holder 28 is an integral part of the cap 12. The interior body of the hollow body 14 of the cap 12 is of cylindrical shape. The cross-sections A-A and B-B in FIG. 2A are shown in FIGS. 2B-2C, respectively. As shown, the cap 12 and the holder 28 integrally formed. As shown in FIG. 2D, which is a perspective view, the holder 28 is a separate part. FIGS. 2B and 2C show the first cap opening 16 which is partially closed by holder 28 so that only a smaller portion, referred to as holder opening 30, of the first cap opening 16 remains open and across which a heating element may extend.

Figure 3:
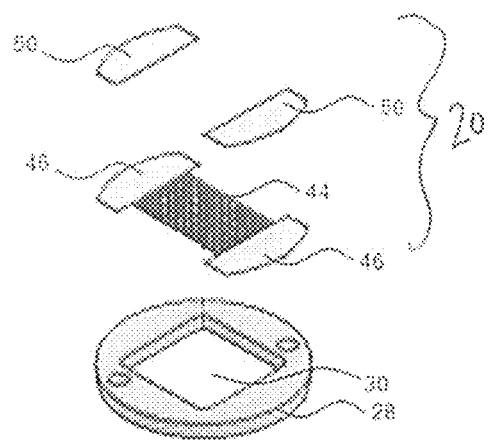
FIG. 3 is an exploded view of a holder, a heating element, and contact areas as manufactured in accordance with at least one example embodiment.

FIG. 3 is an exploded view of a holder, a heating element, and contact areas as manufactured in accordance with at least one example embodiment.

FIG. 3 shows the holder 28 formed as a separate part of cap 12, wherein the heating element 20 is mounted such that the mesh section 44 of the first mesh density extends across the holder opening 30.

Figure 4:
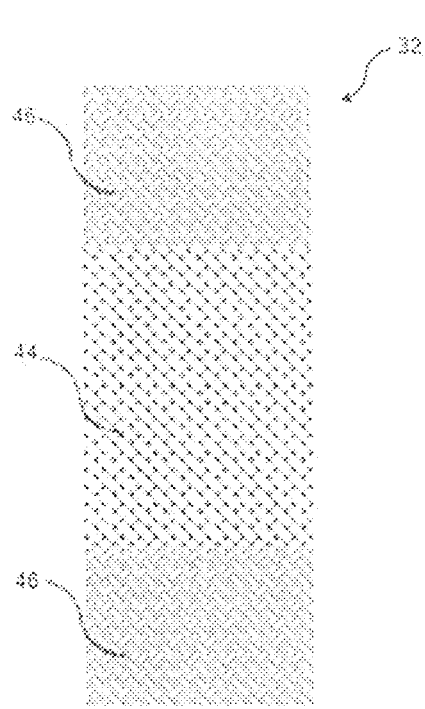
FIG. 4 is a top side view of a mesh having two different mesh densities as manufactured in accordance with at least one example embodiment.

FIG. 4 shows a mesh 32 of the heating element 20. The mesh 32 comprises a mesh section 44 of a first mesh density and, on each of its two extremities, a second mesh section 46 of a second mesh density.

FIG. 4 is a top side view of a mesh having two different mesh densities as manufactured in accordance with at least one example embodiment.

Figure 5:
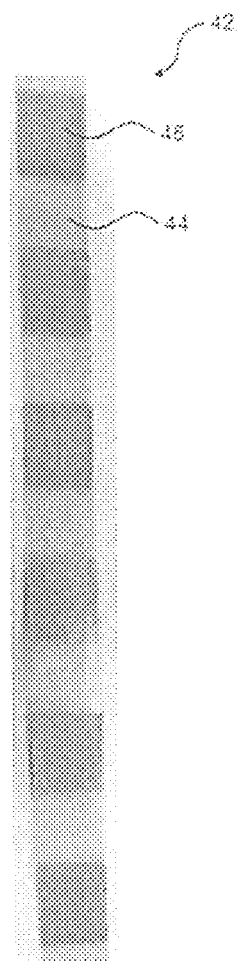
FIG. 5 is a top side view of a mesh strip for manufacturing a mesh in accordance with at least one example embodiment.

FIG. 5 is a top side view of a mesh strip for manufacturing a mesh in accordance with at least one example embodiment.

FIG. 5 shows a mesh strip 42 from which a number of meshes 32 may be die cut.

Figure 6:
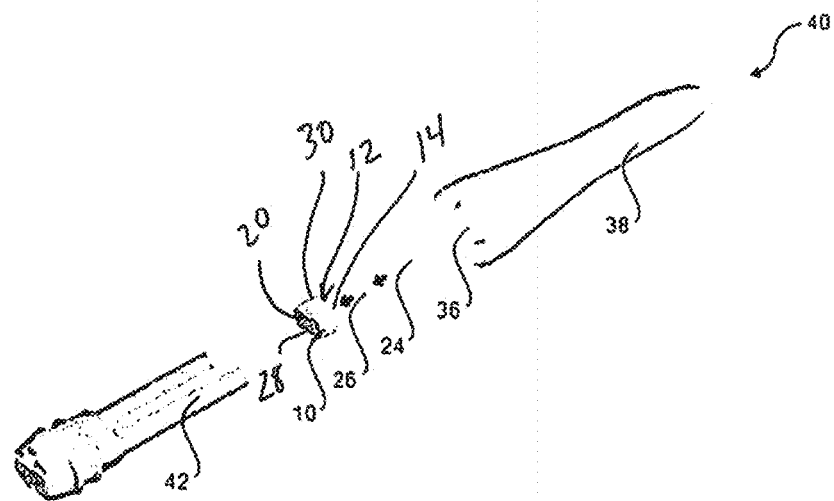
FIG. 6 is an exploded perspective view of a cartridge for an aerosol-generating system that comprises a heater assembly as manufactured in accordance with at least one example embodiment.

FIG. 6 is an exploded perspective view of a cartridge for an aerosol-generating system that comprises a heater assembly as manufactured in accordance with at least one example embodiment.

FIG. 6 shows a cartridge 40 according to at least one example embodiment. The cartridge 40 comprises the heater assembly 10 with a cap 12 and a heating element 20 arranged on a holder 28 of the cap 12. A transport material piece 26 is arranged in a holder opening 30 of the holder 28. A host material piece 24 is arranged in the interior space of the hollow body 14 of the cap 12. The cap 12 acts as a rigid housing for the transport material piece 26 and the host material piece 24. The cartridge 40 further comprises a liquid storage portion for storing liquid aerosol-forming substrate. A retainer 42 is used for retaining the components of the heater assembly 10 and for keeping the heater assembly 10 in contact with the liquid storage portion 36 via the transport material piece 26 and the host material piece 24. Furthermore, the cartridge 40 comprises a mouth piece 38 in which the liquid storage portion 36 is arranged.

Figure 7:
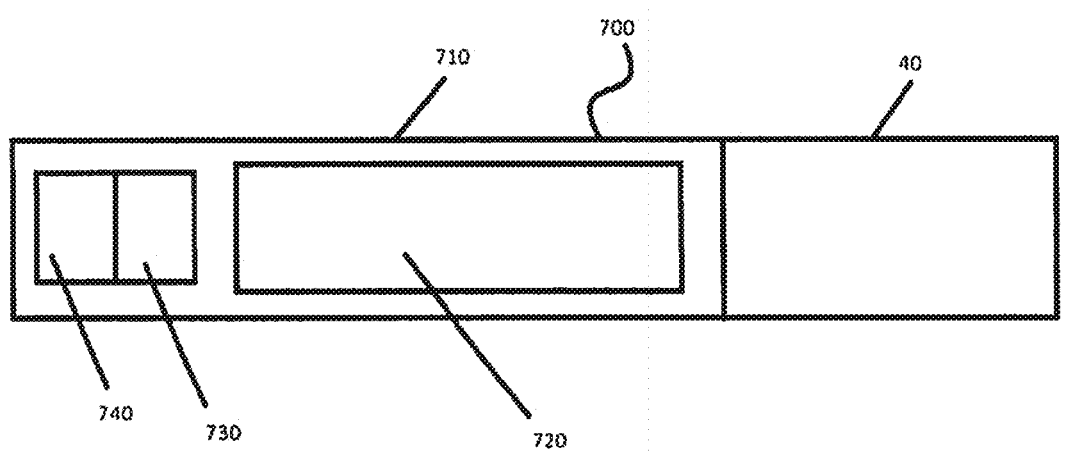
FIG. 7 is a schematic illustration of an aerosol-generating device in accordance with at least one example embodiment.

FIG. 7 is a schematic illustration of an aerosol-generating device in accordance with at least one example embodiment.

In at least one example embodiment, as shown in FIG. 7, the aerosol-generating system 700 may include a main unit 710 and the cartridge 40. The main unit 710 may include a power supply 720, control circuitry 730, and a sensor 740.

Figure 8:
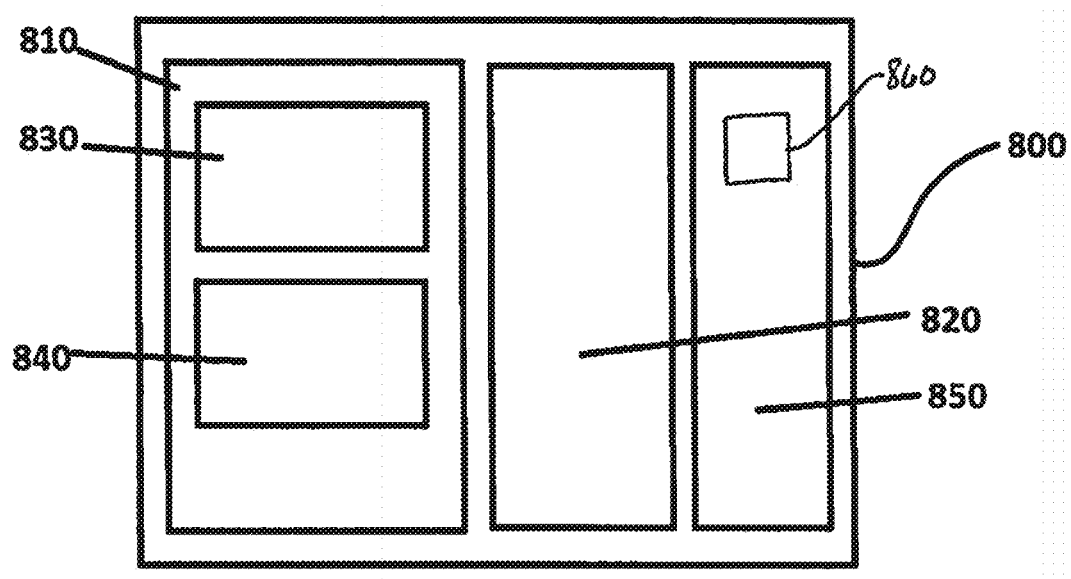
FIG. 8 is a schematic illustration of an apparatus configured to manufacture a heater assembly in accordance with at least one example embodiment.

FIG. 8 is a schematic illustration of an apparatus configured to manufacture a heater assembly in accordance with at least one example embodiment.

In at least one example embodiment, an apparatus 800 configured to manufacture a heater assembly includes a heating element manufacturing unit 810 configured to provide the heating element, and a mesh injection over-molding tool 820 configured to over-mold the cap on edge areas of one side of the heating element.

In at least one example embodiment, the heating element manufacturing unit 810 includes a mesh strip bobbin feeding unit 830 configured to provide a mesh strip. The mesh strip includes an alternating sequence of mesh sections having a first mesh density and of a second mesh density. The heating element manufacturing unit 810 also includes a heater assembly cut-off station 840 configured to cut the heater assembly off the mesh strip by die cutting a mesh off the mesh strip.

In at least one example embodiment, the apparatus 800 further includes an injection molding machine 850 configured to pre-heat plastic granules and inject the same into a mold configured to make the cap. The mesh injection over-molding tool is configured to over-mold the cap onto an underside of a portion of the heating element.

The exemplary embodiments described above illustrate but are not limiting. In view of the above discussed exemplary embodiments, other embodiments consistent with the above exemplary embodiments will now be apparent to one of ordinary skill in the art.

We claim:

1. A method for manufacturing a fluid permeable heater assembly, the method comprising:
   providing a cap;
   providing a heating element, the heating element including a flat electrically conductive heating element including a mesh strip including an alternating sequence of mesh section having a first mesh density and a second mesh density, wherein the providing a heating element includes,
      die cutting bevelled window slots out of each side of a mesh section of the first mesh density to form cur mesh sections, and
      removing loose wires from the cut mesh sections of the first mesh density; and
   over-molding the cap on edge areas of one side of the heating element, wherein the cap comprises a hollow body with a first and a second cap opening, wherein the first cap opening is opposite to the second cap opening, and wherein the heating element extends across the first cap opening.

2. The method according to claim 1, wherein the first mesh density is lower than the second mesh density.

3. The method according to claim 1, wherein over-molding a cap on edge areas of one side of the heating element comprises:
   pre-heating plastic granules,
   injecting the plastic granules into a mold for making the cap, and
   over-molding the cap onto an underside of a mesh section of the second mesh density.

4. The method according to claim 3, wherein over-molding a cap on edge areas of one side of the heating element further comprises:
   cutting the heater assembly off the mesh strip, and removing loose wires from the heating element.

5. The method according to claim 4, wherein cutting the heater assembly off the mesh strip comprises:
   die cutting a mesh off the mesh strip, wherein the heating element comprises the mesh, and wherein the mesh is cut within a mesh section of the second mesh density such that the mesh comprises a mesh section of the first mesh density that is limited by mesh sections of the second mesh density on each of the two ends of the cut mesh.

6. The method according to claim 1, further comprising:
joining at least two electrically conductive contact areas each onto an edge area of the other side of the heating element.

7. The method according to claim 6, wherein joining at least two electrically conductive contact areas each onto an edge area of the other side of the heating element comprises:
providing a tin foil strip;
cutting off tin foil patches from a tin foil strip in a size that matches a shape and a size of the mesh section of the second mesh density; and
compressing a tin foil patch onto the mesh section of the second mesh density.

8. The method according to claim 1, further comprising:
obtaining the heater assembly, and transporting the heater assembly to inspection stations for inspecting;
measuring the electrical resistance of the heating element of the manufactured heater assembly
visually inspecting the heating element for correct wire count, clean cut-off of the mesh, correct mesh integrity, debris and tin foil attachment and
rejecting the heater assembly if the heater assembly fails at least one of an expected electrical resistance of the heating element and an expected result of the visual inspection.

\* \* \* \* \*